G. W. SMITH.
VEHICLE WHEEL.
APPLICATION FILED JAN. 27, 1914.

1,166,416.

Patented Dec. 28, 1915.
2 SHEETS—SHEET 1.

Witnesses
G. F. Baker.
G. F. Vogt.

Inventor
George W. Smith

By Mann & Co.
Attorneys

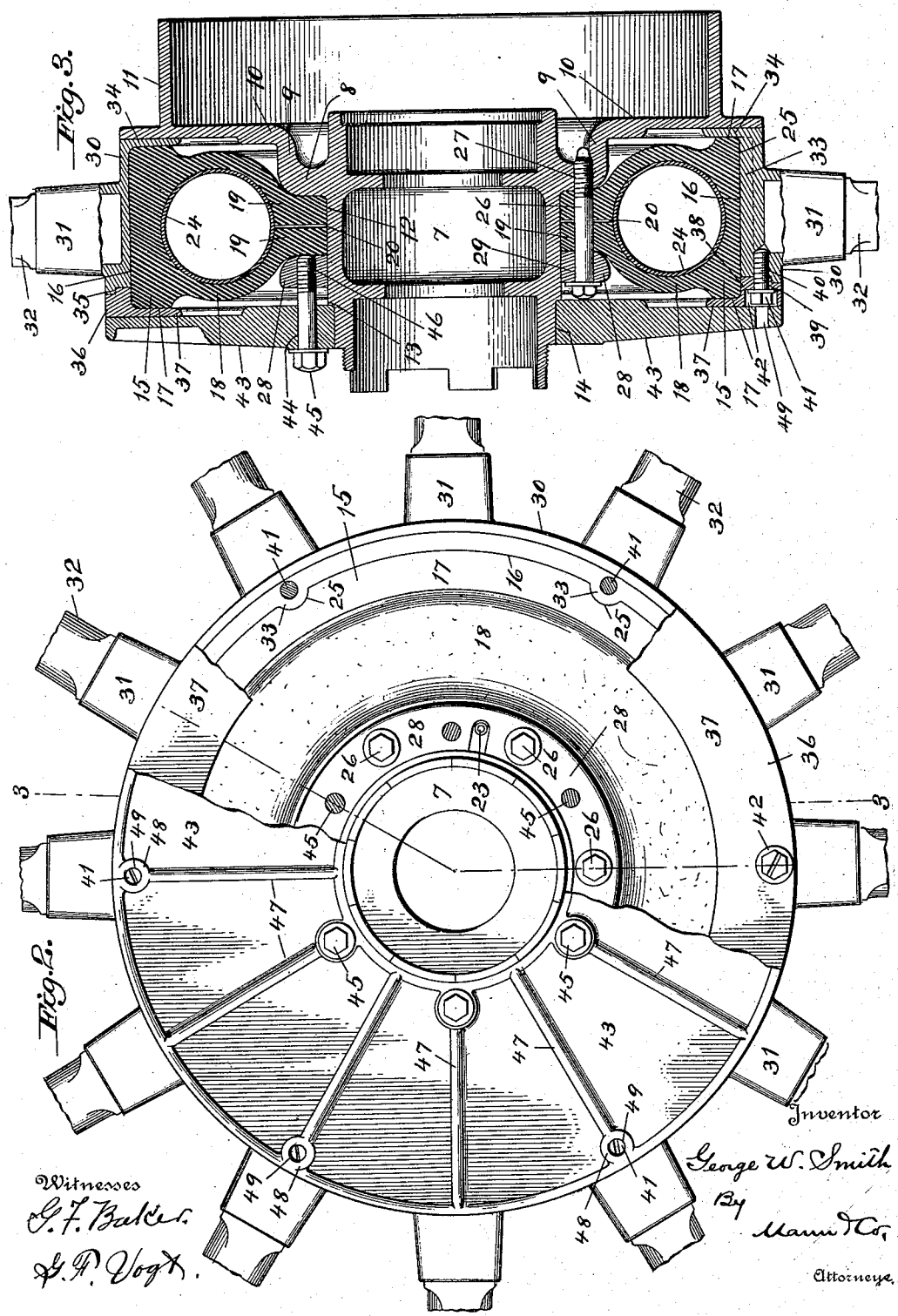

UNITED STATES PATENT OFFICE.

GEORGE W. SMITH, OF BALTIMORE, MARYLAND, ASSIGNOR TO THE ELASTIC WHEEL COMPANY, OF BALTIMORE, MARYLAND, A CORPORATION OF DELAWARE.

VEHICLE-WHEEL.

1,166,416.  Specification of Letters Patent.  Patented Dec. 28, 1915.

Application filed January 27, 1914. Serial No. 814,655.

*To all whom it may concern:*

Be it known that I, GEORGE W. SMITH, a citizen of the United States, residing at Baltimore, in the State of Maryland, have invented certain new and useful Improvements in Vehicle-Wheels, of which the following is a specification.

This invention relates to improvements in vehicle wheels and has particular reference to that class of wheels in which a cushion is provided around the hub and between said hub and the inner ends of the spokes.

An object of the invention is to provide an improved construction of hub structure and associated parts whereby to inclose the pneumatic cushioning means and its surrounding shoe in a practical and efficient manner and to securely retain the same in place.

The invention is shown in the accompanying drawings, wherein,—

Figure 1:
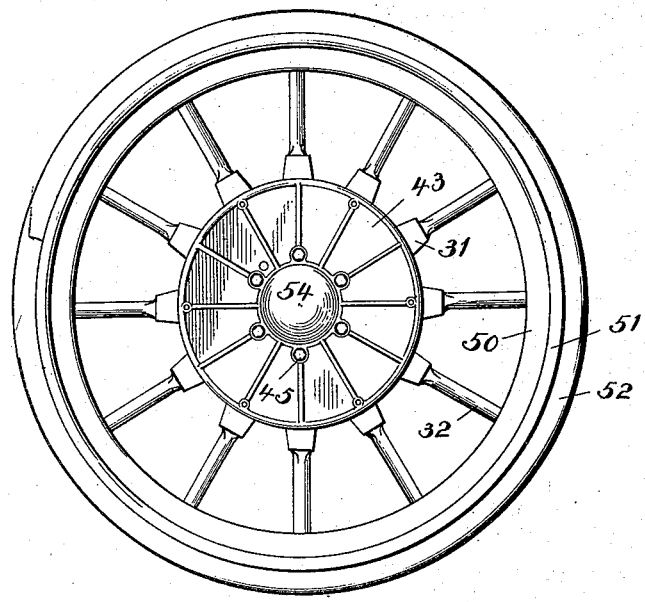
Figure 4:
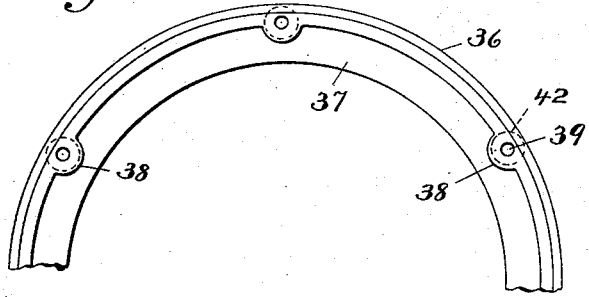
Figure 6:
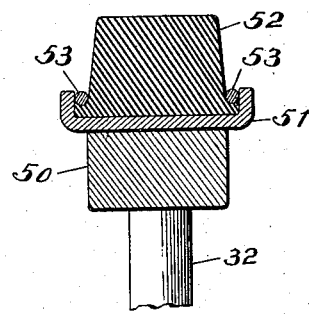
Figure 5:
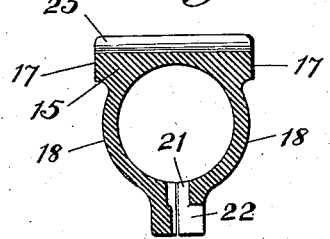

Figure 1, illustrates an entire vehicle wheel embodying the invention. Fig. 2, shows a much enlarged view of the hub structure,—part of the same being shown in side elevation and other portions thereof being sectioned to disclose the inclosed structure. Fig. 3, illustrates a diametric crosssection through the hub,—the section being taken on the line 3—3 of Fig. 2. Fig. 4, shows a portion of the outer retaining shoe-ring as viewed from the inner or shoe-side thereof. Fig. 5, illustrates a cross-sectional detail on a reduced scale through the outer shoe at the point where the valve-stem of the pneumatic tube projects therefrom, and Fig. 6, shows a cross-sectional detail through the outer tire and the wheel-rim.

Referring to the drawings by numerals, 7, designates the inner central hub shell through which the axle, not shown extends and in which the anti-friction bearings are to be located. The exterior of the central hub-shell is provided with an annular circumferential shoulder, 8, from which a lateral outwardly-extending flange, 9, and a circular bearing-plate, 10, extend. This bearing plate forms one side wall of the wheel hub and is rigid with the central hub shell. In the case of a driving wheel this bearing plate, 10, will be provided with a circular drum, 11, around which the brake-band will pass. The hub-shell, 7, from the base of the annular shoulder, 8, toward the opposite side thereof has a smooth circumferential face, 12, and at its extreme side has an annular shoulder, 13, and an annular reduced portion, 14, for a purpose presently to be explained.

A comparatively heavy elastic shoe, 15, encircles the hub-shell, and said shoe has a thickened outer circumferential face 16, of substantially the same diameter from one side to the other so as to provide a practically flat bearing face cross-wise of its circumference, as clearly shown in cross-section in Fig. 3. This shoe also has straight flat side portions, 17, immediately adjacent to the circumferential face, 16, and reduced and inwardly-curved side portions, 18, which extend from the straight side portions, 17, toward and terminate at comparatively narrow confronting clamping portions, 19, which are detached from each other by a circumferential split or slit, 20. These confronting narrow clamping portions, 19, of the shoe have each a flat inner circumference so as to encircle the smooth face, 12, on the outer side of the hub-shell and one of the said clamping portions is seated close against the annular shoulder, 8, on the exterior of the hub-shell. By referring to Fig. 3, it will be seen that when the elastic shoe is in position around the hub-shell, the lateral flange, 9, of said shell forms an annular seat at the base of the side curved portion, 18, at that side of the shoe,—said curved portion extending around said flange.

By referring to Fig. 5, of the drawing it will be noted that at one point in the circumference of the shoe, the latter has a radial passage, 21, and a lateral passage, 22, the purpose of which is to permit the passage of the valve-stem, 23, of an inner pneumatic tube, 24, which is inclosed by and has position in the shoe. It will also be noted by reference to Fig. 2, the lower portion of Fig. 3 and Fig. 5, that the thickened outer face of the shoe, 15, has cross-wise extending semi-circular grooves, 25, at intervals around its outer circumference. The purpose of these grooves will hereinafter be set forth.

The confronting narrow clamping portions of the shoe are provided with registering cross-wise perforations at spaced-apart intervals around its circumference so that suitable clamping bolts, 26, may be passed therethrough and screwed into threaded perforations, 27, that are circumferentially arranged in the annular shoulder, 8, of the hub shell.

On the outer side of the clamping portions of the shoe, a clamping ring, 28, is provided. This ring snugly fits the smooth face, 12, of the hub-shell and seats close against the outer clamping shoe-portion and the bolts, 26, pass freely through perforations 29, in the ring, then through both clamping portions of the shoe and finally has its threaded end screwed into the perforations, 27, in the shoulder, 8, as clearly shown in Fig. 3. It is therefore to be understood that when the ring, 28, is seated against the outer side of the shoe and the bolts, 26, screwed up tight, the shoe will be securely clamped between the shoulder, 8, and ring, 28, and held in an encircling position around the central hub-shell.

An outer spoke-drum, 30, has a plurality of radial spoke-sockets, 31, on its exterior in which the inner ends of the usual spokes, 32, are seated. The inner side of this drum is of a diameter to snugly receive the shoe so that the outer cross-wise flat face of the shoe will seat against a corresponding surface on the interior of the drum. The drum also has around its interior circumference, at spaced-apart intervals, semicircular lugs, 33, which register with and project into the semicircular grooves, 25, in the outer face of the shoe. By means of the engagement of lugs, 33, and grooves, 25, the shoe is locked to the inner side of the drum and independent rotation is prevented. At the inner side, drum, 30, has an inwardly-extending annular flange, 34, the inner side of which seats close against the straight flat side portion, 17, of the shoe, and the outer side of which flange has frictional contact with the bearing plate, 10, of the central hub-shell.

The outer side face of the drum, 30, has a circular rabbet or bead, 35, and a retaining ring, 36, having a flange, 37, seats against the rabbet of the drum and has its flange engaging the outer flat side, 17, of the shoe. This ring, which is shown in inner side elevation in Fig. 4, has semi-circular lugs, 38, on its inner face to enter the ends of the grooves, 25, in the outer shoe face. A perforation, 39, is provided in each lug, 38, of the ring and when the ring is in position these perforations register with screw-threaded sockets, 40, which are located in the ends of the circular lugs, 33, of the drum, as shown in Fig. 3, so that retaining screws, 41, may be passed through said perforations and screwed into said sockets to rigidly secure the ring to the drum. Suitable circular openings, 42, are provided in the outer side of the retaining ring, 36, so the heads of the screws, 41, will have a countersunk position beyond the outer face thereof. From the foregoing explanation it will be understood that the retaining ring, 36, is carried by the drum, 30, and that the flange, 37, of the ring engages the flat vertical side, 17, of the shoe to hold the latter in place.

A ring-plate, 43, closely fits onto the reduced annular portion, 14, of the hub-shell and the inner side of said ring-plate seats against the annular shoulder, 13, of said shell. This ring-plate has a circular series of smooth bore perforations, 44, around its central opening and bolts, 45, extend freely through said perforations and screw into threaded holes, 46, that are provided in the clamping-ring, 28. By means of the annular series of bolts, 45, the exterior ring-plate, 43, will be held rigidly around the hub-shell and be bolted in rigid relation with respect to the clamping ring, 28. The inner side of the ring-plate from its outer periphery inwardly, forms a side bearing plate against which the retaining ring, 36, contacts.

Suitable radial stiffening ribs, 47, are provided on the exterior of the ring-plate and at the extreme outer ends, some of these ribs have circular enlargements, 48, with perforations, 49, extending therethrough. These perforations, it will be seen register with the retaining screws, 41, and the circular openings, 42, in which the heads of said screws are located, as shown in Figs. 2 and 3. By means of these perforations, 49, the wheel may be converted into a perfectly rigid wheel, in case of an emergency, by simply removing the screws, 41, and using a longer screw that will pass through said perforations, 49, then through the perforations, 39, of the retaining ring, 36, and finally screwing into the threaded sockets, 40, of the drum.

The outer ends of the spokes, 32, enter a felly, 50, around which a metal rim, 51, extends, and a cushion or solid rubber tire, 52, is seated in said rim and held in place by means of wire, 53, or other means.

A suitable cap, 54, is preferably secured onto the outer end of the hub-shell to inclose the end of the axle.

In operation, the weight of the vehicle will be transferred to the hub-sleeve which latter will be sustained by the inner circumference or clamped portions of the inclosed shoe. The inner pneumatic tube, 24, in the shoe will, of course keep the latter yieldingly distended, while the outer face or circumference of the shoe is rigidly engaged with the inner side of the spoke-drum. This construction enables the hub-shell to have a somewhat floating position on the interior of the shoe and as the wheel revolves there is more or less radial movement of the shell; shell-flange, 10, ring-plate, 43, and the parts rigidly connected thereto, with respect to the drum. By securing the drum; retaining-ring and outer face of the shoe, as above described, independent rotation of the shoe with respect to the drum is prevented. By clamping the inner diameter of the shoe with respect to the hub-shell independent movement between these parts is obviated. Notwithstanding that the outer circumference of the shoe is locked to the drum and the inner circumference thereof is locked to the hub-shell, the elasticity of the shoe is maintained.

It will be seen that no part of the shoe has contact with any frictional surface and that all friction takes place on metal parts. It will also be noted that the clamping portions of the shoe are so formed that the interior is substantially a true circle and that liability to pinch the inner tube is entirely avoided.

Having thus described my invention what I claim and desire to secure by Letters Patent is:—

1. In a vehicle wheel the combination with a central hub shell having an annular shoulder and a bearing plate both formed integrally with the shell and the bearing plate being at one side of the hub, of a ring plate at the other side of the hub; a ring around the hub between the bearing plate and ring plate; bolts connecting the ring plate and ring; a hub-shoe between the bearing plate and ring plate; a drum around the shoe and having spoke sockets on its outer side; a retaining ring between the periphery of the ring plate and one side of the drum and bolts passing through the retaining ring and entering the drum, said retaining ring engaging the hub shoe.

2. In a vehicle wheel the combination with a central hub shell having an annular shoulder with circumferential threaded perforations and a bearing plate,—said bearing plate and shoulder being formed integrally with the hub shell and the bearing plate extending laterally and outwardly from the shoulder, of a ring around the hub shell and provided with perforations to register with the perforations in the shoulder; an elastic shoe encircling the hub shell and provided with inner circumferential lapped portions that project between the ring and the said shoulder the lapped portions of the shoe each having perforations that register with the perforations in both the ring and shoulder; bolts passing through the perforations in the ring, lapped shoe portions and shoulder and a ring plate around the outer side of the hub shell and elastic shoe.

3. In a vehicle wheel the combination with a central hub shell provided with an annular shoulder and a laterally and outwardly extending bearing plate at one side of the shell, the annular shoulder having circumferential threaded perforations, of an elastic shoe having one side of its inner circumferential portion seated against said annular shoulder and provided with perforations extending therethrough that register with the perforations in the shoulder; a ring around the shell and at the other side of the said inner shoe portion said ring having perforations therein that are threaded and also having other perforations that are smooth and which latter register with the perforations in the shoe and the hub shoulder; bolts extending through the smooth ring perforations and also through the shoe perforations and engaged in the perforations in the shoulder; a ring plate around the hub and provided with smooth perforations that register with the threaded perforations in the said ring and bolts passing through the smooth perforations in the ring plate and screwed into the threaded perforations of the ring.

In testimony whereof I affix my signature in presence of two witnesses.

GEORGE W. SMITH.

Witnesses:
ELMER G. PARELY,
ELIZABETH W. WEEMS.

Copies of this patent may be obtained for five cents each, by addressing the "Commissioner of Patents, Washington, D. C."